Figure 1:
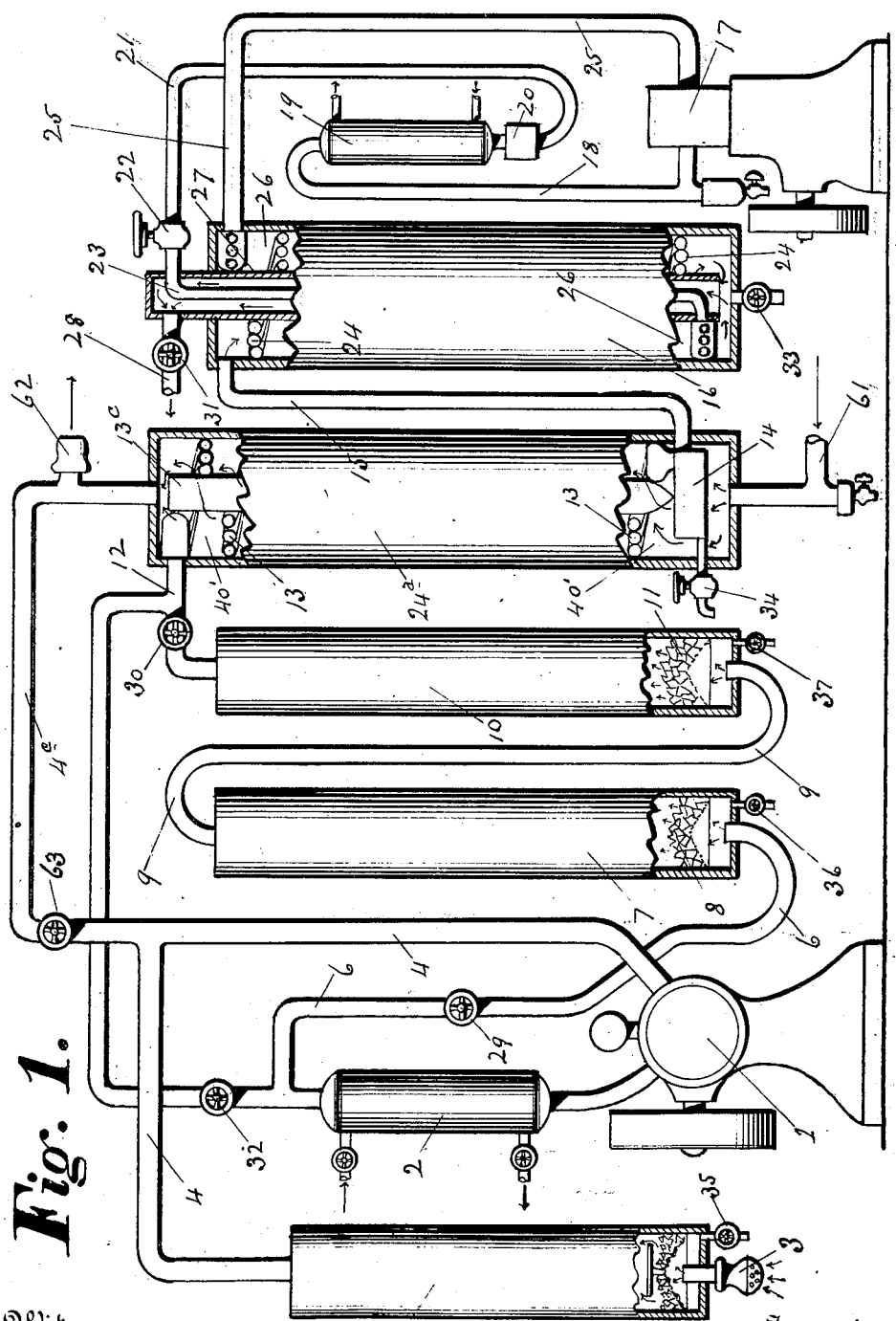

J. F. PLACE.
ART OR PROCESS OF LIQUEFYING AND SEPARATING AIR.
APPLICATION FILED NOV. 29, 1907.

1,152,044.

Patented Aug. 31, 1915.
2 SHEETS—SHEET 1.

Witnesses:
J. Gadsden.
C/avier Plan

Inventor
J. F. Place

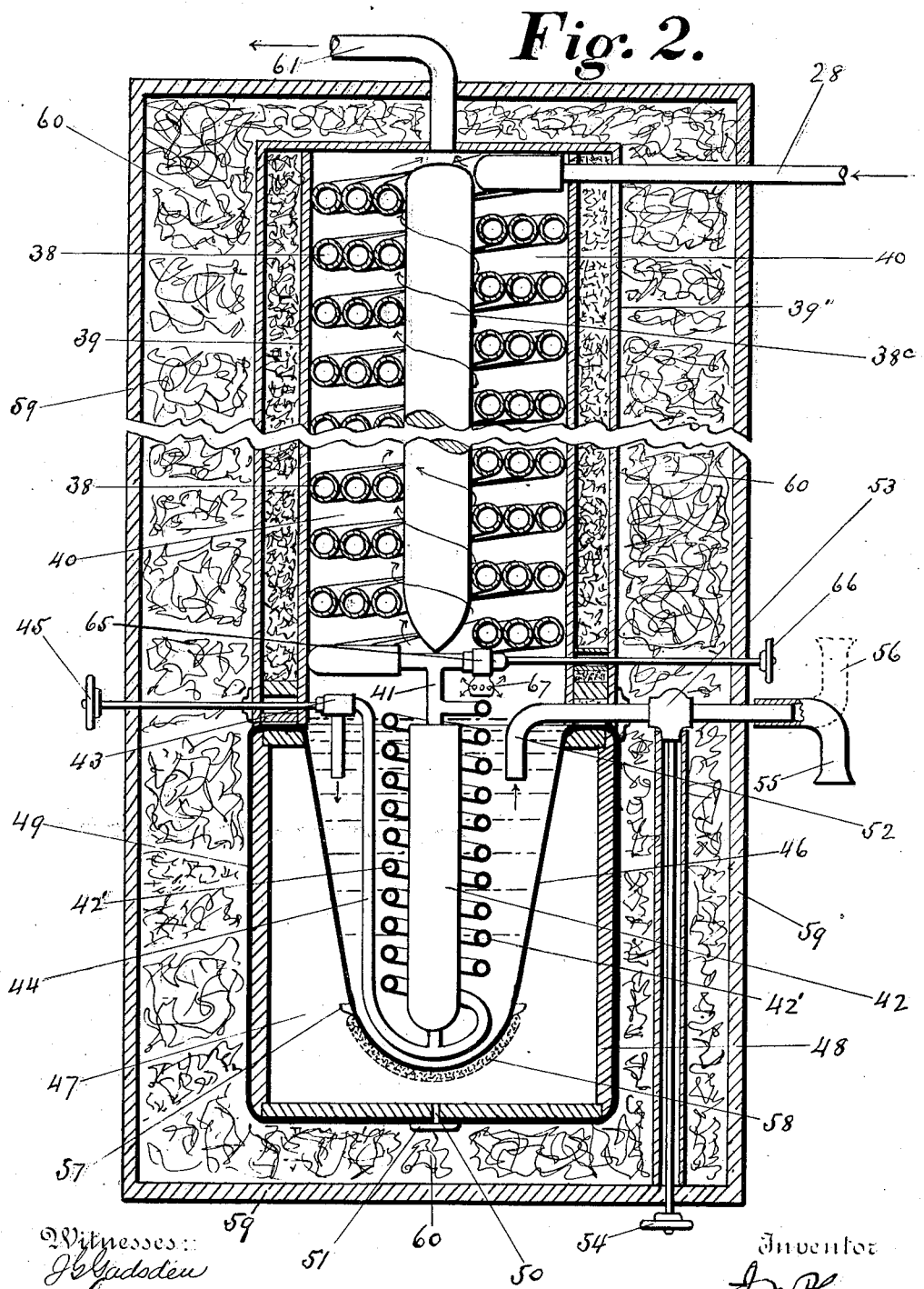

UNITED STATES PATENT OFFICE.

JAMES F. PLACE, OF GLEN RIDGE, NEW JERSEY, ASSIGNOR TO AMERICAN AIR LIQUEFYING CO., A CORPORATION OF NEW YORK.

ART OR PROCESS OF LIQUEFYING AND SEPARATING AIR.

1,152,044.  Specification of Letters Patent.  Patented Aug. 31, 1915.

Application filed November 29, 1907. Serial No. 404,244.

*To all whom it may concern:*

Be it known that I, JAMES F. PLACE, a citizen of the United States, and a resident of Glen Ridge, in the county of Essex and State of New Jersey, have invented certain new and useful Improvements in the Art or Process of Liquefying and Separating Air, of which the following is a specification.

This invention relates to an improved art or process of liquefying air.

My process also involves the separation of the constituent gases of air, to a greater or less degree.

One object is to reduce the cost of the production of liquid air, and correspondingly lessen the cost of its constituent gases—oxygen and nitrogen.

In order that those skilled in the art may make use of my invention, I will describe the same as illustrated by the accompanying drawings, in which—

Figure 1 is a diagrammatic view, showing the necessary mechanism used in preparation of the air for liquefaction by my process, namely, the air compressor and water cooler; quick-lime, calcium chlorid and caustic potash drums for removing the moisture and carbonic-acid gas from the air; and the $CO_2$ freezing drum for freezing out further moisture, and aiding the thermal interchanger in reducing the temperature of the air. Fig. 2 is a view in vertical section of my thermal interchanger, and submerged air-liquefying condenser and its accessories, used in availing of my art or process.

In my invention, I utilize the latent heat of vaporization required by liquid air at substantially atmospheric pressure, to cool and liquefy air while at or above its critical pressure when there is no latent heat of condensation given out to neutralize refrigeration and retard liquefaction. It is well known that the critical pressure of air is 39 atmospheres, and its critical temperature is $-220°$ F. It will condense to a liquid at $-220°$ F., if it be compressed to 39 atmospheres; and it will liquefy at a lower compression if cooled to a lower temperature, or at atmospheric pressure if cooled to $-312.6°$ F.; but no amount of compression will cause liquefaction unless it be cooled to its critical temperature, namely, $-220°$ F. If compressed to 39 atmospheres and cooled to $-220°$ F., its density then as a gas is identical with its density as a liquid; and with the slightest lowering of the temperature then, its change of state from a gas to a liquid (if the pressure is maintained) is instantaneous, and there can be no latent heat of condensation, as there is practically no further contraction.

By my process I compress air to about 45 atmospheres (647 lbs. gage) and liquefy all of the air compressed, without any reduction of pressure. It is liquefied in a high-pressure condenser, which is kept submerged in liquefied air of substantially atmospheric pressure, and after liquefaction it is sub-cooled as a liquid before release from pressure, until it is about the same temperature of the low-pressure liquid air surrounding the condenser, or $-313°$ F. Afterward it is released from pressure (as a sub-cooled liquid) and delivered to the insulated reservoir which surrounds the condenser, (thus replenishing the evaporating liquid-charge therein) to liquefy and sub-cool new and successive charges of cooled compressed air in the submerged condenser. The latent heat of vaporization required by liquid air at atmospheric pressure is about 120 B. T. U. per pound; and this, with the cooling effect of the vapor of the evaporated liquid (as it passes through the thermal interchanger and absorbs heat from the incoming compressed air unitl it rises from $-313°$ F. to normal temperature), is all utilized.

I will now describe my art or process, and in doing so will refer to the mechanism I preferably make use of, as illustrated in the accompanying drawings, in which similar reference numerals refer to similar parts throughout.

At 1 in Fig. 1 I show an ordinary 3-stage air compressor, or a compressor capable of compressing air to say about 50 atmospheres, having the water cooler 2. This compressor is supplied with air at the suction inlet 3, and suction pipe 4, which air is drawn through the quick lime in the drum 5 for the purpose of absorbing the carbonic acid gas in the air. The air after compression to about 45 atmospheres (or say 647 lbs. gage) is delivered through pipe 6 to the calcium chlorid drum 7, and passed through the charges 8 of lump calcium chlorid; and thence through pipe 9 to the caustic potash drum 10, and through similar charges 11, of broken caustic potash. The subjection of the compressed air to this purifying treatment usually removes every trace of $CO_2$ gas in the air and will reduce the moisture of the air to about 10% saturation. The air is then passed through pipe 12 into what I call the pre-cooler ($24^a$) which is the first section of my counter-current thermal interchanger. This consists of the triple copper helical coil 13 around the center core $13^c$ having at the lower end the drip "catch" receiver 14, from which it passes through pipe 15 to the $CO_2$ freezing drum 16.

The drum 16 is a part of the $CO_2$ mechanical refrigerating apparatus, for preliminary reduction of the temperature of the air and for freezing out any remaining moisture therein. It consists of the usual appliances used in mechanical refrigeration, namely, a high-pressure $CO_2$ gas compressor 17, connecting discharge pipe 18 delivering to the water-cooled condenser 19, liquid $CO_2$ reservoir 20, liquid discharge pipe 21, and liquid $CO_2$ pressure-releasing valve 22. The $CO_2$ released liquid is thence delivered to the vaporizing pipe 23 and triple upwardly-delivering helical coils 24. The vaporizing liquid or $CO_2$ gas then passes to the return pipe 25, and is thence delivered to the compressor where it is recompressed. By construction of the freezing drum 16, as shown, a helical passage 26 is formed between the $CO_2$ copper coils (24) through which the compressed air from pipe 15 is passed down through the drum and upwardly into the inner conduit 27. In this way the compressed air passes in a contrary direction to the flow of the vaporizing $CO_2$ gas in the expansion pipe 23 and vaporizing coils 24. A temperature of 30° to 40° below zero, Fahrenheit, can easily be maintained in the drum (16), so that the compressed air as it leaves the drum by pipe 28, is practically free of moisture, and is at a temperature of about −36° F.

Any frost or ice in the compressed air coils 13 or on the outside of the $CO_2$ pipes 23 and 24 may be easily melted by closing air valves 29, 30 and 31, and opening air valve 32 and partially opening the drip cock 33; then by shutting off the water to the cooler 2 the compressor will deliver hot air to the air coils 13 and drum 16, without passing it through the purifying drums 7 and 10. The water may be drawn off through drip cocks 33 and 34. At 35, 36 and 37 are drip cocks for lime barrel and calcium chlorid and caustic potash drums, respectively.

Having thoroughly dried and purified the compressed air, it is now passed to the main counter-current thermal interchanger and submerged liquefier, from pipe 28 (see Figs. 1 and 2). I make the interchanger preferably of a triple helical descending copper coil 38 around the hollow core $38^c$, and inclosed in the double-walled conduit 39 and 39′, which allows or forms the expanded air or vapor return-flow or counter-current helical passage 40 between the coils 38. The coils 38 deliver to the connecting pipe 41 and the air-liquefying submerged condenser, which consists preferably of the copper drum 42 and the liquefying coil 42′ around the drum, and being connected therewith both at top and bottom. At 43 I show a liquid-air pressure-releasing valve, connected with the bottom of the liquefying condenser 42 and coil 42′ by the siphon pipe 44; the valve 43 being operated by the outside hand wheel 45. At 46 I have a liquid-air low-pressure evaporating holder, which incloses the condenser and its liquefying coil. This evaporating holder is insulated by the vacuum 47, held by the outer rigid case or barrel 48. I allow the sheet metal which forms the liquid-air vessel 46 to pass around and inclose the barrel 48 as shown at 49, thus forming a complete air-tight inclosure. I pump the air out of the space 47, through the aperture 50, and then fill the space with $CO_2$ gas, and seal up the aperture 50 with the cap 51. At 52 I have an overflow outlet to vessel 46, controlled by the valve 53 which is operated by the hand wheel 54; this outlet has a movable outer elbow or spout 55, which may be turned upward as shown by the dotted lines 56, and used as a filling spout to fill the evaporating vessel 46 with an initial charge of liquid air from an outside source.

At 57 I have an annular cup or "catch" around the outside of the vessel 46, near the bottom; and at 58 I show a wire gauze cap or cup fitted over the outside of the lower end of the vessel 46, which is filled with charcoal. As I fill the vessel 46 with liquid air, the $CO_2$ gas in the space 47, rapidly condenses to $CO_2$ liquid on the surface of the vessel 46, and is collected in the "catch" 57, and is thus frozen solid and held in contact with said surface so that it cannot reëvaporate to a gas. In this way an almost perfect vacuum is produced in the annular space 47, thus thoroughly insulating the liquid air in the evaporating holder 46 from outside heat. If there should be any traces of air in the $CO_2$ gas in the space 47, this will be quickly absorbed by the charcoal in the gauze cup 58, as this charcoal is held close to the coldest surface of the vessel 46, and charcoal when at the low temperature of liquid air has great power of absorbing gaseous air. I am thus particular in forming the vacuum insulation around the evaporating holder 46, as it is important in my process to thoroughly insulate the liquid air in said vessel from circumambient heat.

I inclose the apparatus in the outer case 59, which is filled with insulating packing 60. I also insulate the interchanger by filling with eider-down the annular space between the walls 39 and 39' of the conduit which incloses the same.

The vapor or expanded air helical passage 40 delivers to the pipe 61 (see Figs. 2 and 1), which delivers to the low-pressure helical passage 40', in the pre-cooler 24ª (see Fig. 1), and thence to the air-expanded pipe 4ᶜ. Here it may be discharged to the outer atmosphere through check valve 62, by closing valve 63; or it may be returned to the compressor and re-compressed by opening valve 63. It will thus be noticed that I make use of the cold expanded air before it is finally discharged, to cool the compressed air somewhat before it is passed into the $CO_2$ refrigerating drum 16. In this way the expanded air is finally discharged or returned to the compressor, at practically the same temperature of the air as it leaves the purifying drums 7 and 10, or at about $+60°$ F.; and whatever cooling is obtained from the $CO_2$ freezing drum (16) is a clear gain, and serves not only to freeze out the last traces of moisture from the compressed air, but also to off-set any "thermal gains" of the system by reason of imperfect insulation.

As the air in the supply coils 38 and the condenser 42 and the air-liquefying coil 42', (see Fig. 2) is maintained at a compression substantially at or above its critical pressure, it will liquefy at $-220°$ F.; and as, when at that pressure and at that temperature, its density as a gas is identical with its density as a liquid, it then passes to a liquid instantaneously, if its temperature is lowered in the slightest degree, if the pressure be maintained at or above 39 atmospheres. The liquid air in the evaporating holder 46, being at substantially atmospheric pressure, its temperature is maintained at about $-313°$ — or 93 degrees colder than the liquefying point of the cooled compressed air in the submerged drum 42 and submerged coils 42'.

At 65 I show an air-expansion valve, generally for use only in starting up, when an initial charge of liquid air for the evaporating vessel 46 is not obtainable; it is located above the condenser 42, or between it and the compressed-air supply, and is operated by the outside hand wheel 66 and discharges through the perforated expansion head 67. By opening this valve (65) a trifle, it acts as a throttled orifice or porous plug, and the compressed air in pipes 38, (at 45 to 50 atmospheres tension) is released or let down to substantially atmospheric pressure in the head 67 after it has passed through said valve; and in thus being released it drops in temperature in accordance with the well-known formula of the so-called "Joule-Thomson effect." The cooled expanded air is conducted back through said conduit (39) in the helical passage 40 and 40' over the compressed air supply pipes 38—that which liquefies dropping by gravity into the vessel 46. The air in these pipes and in condenser 42 and 42' is maintained at full pressure, the opening of the valve 65 not being so great as to reduce the pressure. As soon as the holder 46 is filled with a liquid-air charge, valve 65 may be closed and its further use dispensed with, if preferred.

An important and novel feature of my invention is the location of the liquefier proper or high-pressure condenser 42 and coil 42' within the liquid air vessel or holder 46; and making of that condenser a closed drum, as it were, so that only compressed air of high tension (to or above its critical pressure) fills it, and without current or flow therein, as all the air supplied to it becomes liquefied; therefore the only delivery of compressed air thereto is to take the place of that which has become liquefied therein while at substantially its critical pressure; and no air can escape therefrom until after it is liquefied but only liquid air through siphon pipe 44 and valve 43. By having this condenser 42 and 42' located as shown, it is submerged in the liquid air in the vessel or holder 46, at all times, whether the holder has therein an initial charge of liquid air, or whether it is supplied with liquefied air from the condenser 42. The liquefied air as it accumulates in the condenser or liquefier 42 or 42', may be discharged through the liquid discharging valve 43 in separate and distinct charges, intermittently, or it may be discharged continuously before it entirely fills the condenser 42.

As has been indicated above, the air expansion valve shown at 65 may be kept open during the operation of the apparatus. When this is the case it will be noticed that the incoming compressed air delivered to coils 38 (Fig. 2), as subjected to the cumulative refrigerative effect of the vapors from the evaporating liquefied gases in the low-pressure evaporating vessel 46, reinforced or augmented by the cold gases expanding from the throttled valve 65 and expansion head 67, as said vapors and unliquefied gases pass up through said helical passage 40, will grow colder and colder as it passes down through the coils 38 in a contrary direction so that there will be partial liquefaction, leaving an unliquefied portion to be released from pressure and expanded through the throttle 65 and expansion head 67.

The apparatus which illustrates my process and which accompanies this specification, as may readily be seen, is especially adapted to bring about the change, as above noted, of partial liquefaction; for by adjusting the valves 43 and 65 any desired proportion of the liquefied or unliquefied gases may be released. The amount of air passed through these valves will govern the temperature in coils 38 and consequently the amount of air liquefied therein. The location of the expansion valve 65 at the lower end of the liquefying coils 38 or between that lower end and the submerged receiver 42, is just at the point required to take the unliquefied portion which is left in the coils 38 (or in the receiver 42) when used as a liquefying condenser and by releasing from pressure, expand the same.

By my process, as herewith illustrated, the resulting liquid in the low pressure evaporating vessel 46, as drawn off finally through valve 53, will be almost pure oxygen liquid. The vapors from the evaporating vessel 46 will come in contact and mix with the expanded gaseous residue from the expansion head 67 and by rectification and thermal inter-action between the two the oxygen gas in the vapors will become condensed and collect in the vessel 46 while the unliquefied portion, principally nitrogen, will pass through the helical passageway 40 and out through the pipe 61.

If during the operation of the apparatus check valve 62 (see Fig. 1) is kept open and valve 63 is kept closed, my apparatus in liquefying will also partially separate the two gases, oxygen and nitrogen, (owing to the difference in temperature of their boiling points) by fractional evaporation of the liquefied air in the low-pressure holder 46; and consequently the overflow liquid drawn from the apparatus through discharge tube 52 will be very rich in oxygen, and the return flow of expanded gas or air leaving the system through valve 62 will be correspondingly rich in nitrogen.

If the liquefied air in the high-pressure condenser 42 or 42' is discharged therefrom as soon as condensed, then the latent heat of vaporization required, as released from pressure, would naturally be absorbed from the liquid itself, until its temperature falls to its boiling point—313° F. The preferred method of operating, however, is to allow the liquefied air in the high-pressure submerged condenser 42 to remain therein until it is sub-cooled, or cooled after liquefaction, down from —220° F., to —312.6° F., the temperature of the liquid surrounding the condenser in the insulated evaporating vessel 46. Then the liquid air in the condenser 42 and 42' released from pressure and delivered to the evaporating vessel 46, will already be at the temperature in such vessel, and will not vaporize on being released.

Fractional evaporation of the liquid in the holder 46 will then go on continuously, for the difference in temperature between the evaporating liquid in the holder 46 and the liquefying point of the cooled compressed air (40 to 45 atmospheres) in the condenser 42, is 90 degrees Fahrenheit; the latent heat, now at its maximum, being drawn entirely from both the cooled compressed air and the liquefied air in the condenser 42 and 42'—rapidly liquefying the compressed air therein (without reduction of pressure) and sub-cooling the liquid as fast as produced. All of the vapor from the evaporated liquid in the holder 46, at substantially atmospheric pressure, and at a temperature when evaporated of about —312.6° F., is carried back in the conduit 39, through the passages 40 and 40', and serves to cool the incoming supply of compressed air in the counter-current coils 38 and 13.

An important feature of the process is the fact that the evaporating holder or insulated reservoir 46 cannot be emptied; once charged it remains practically full of liquid at substantially atmospheric pressure, during the operation of the apparatus, the surplus, or overflow alone being drawn from the reservoir. This surplus or output of liquid, by reason of the high-pressure submerged liquefier herein shown, and other valuable features herein described, will be much more than heretofore obtained for the energy expended in this class of air-liquefying apparatus, or about 50% of all the air treated.

I am aware that compressed air has been liquefied by subjecting the same to the cooling action of liquid air, for instance, as shown in my U. S. Patent No. 666,693; but I know of no case in which air has been thus liquefied while compressed to a tension to or above substantially its critical pressure. In all such cases where air has been liquefied by liquid air, the object sought has been not liquefaction but separation, and neither utilization of nor reference has been made to the principle or physical law involved in this invention, that air liquefies at its critical point (or junction of critical pressure and critical temperature) without giving out practically any latent heat of condensation; and that when liquid air evaporates at substantially atmospheric pressure it requires a large amount of latent heat, or about 120 B. T. U. per pound. This principle or irrefutable law, which governs the vaporization of all liquids and the liquefaction of all gases, I utilize by my improved art or process herein for liquefying air.

Having thus described my invention, what I claim as new and original and desire to secure by Letters Patent, is—

1. The art or process of liquefying atmospheric air consisting of or including the compressing of air substantially to or above its critical pressure, removing the heat of compression and absorbing moisture and carbonic acid gas therefrom; and then subjecting the same consecutively, to a succession of increasingly refrigerative actions—1st, to the cooling action of a counter-current of low-pressure expanded air below the normal temperature; 2nd, to the refrigerative effect of a liquefied gas released from pressure and evaporated; 3rd, to the cooling action of a counter-current of the vapor and cold expanding gases evaporated from liquid air of substantially atmospheric pressure; and 4th, to the cooling action direct of said low-pressure evaporating liquid air—thereby liquefying said cooled compressed air while at substantially its critical pressure.

2. In the art or process of liquefying air, the method of cooling preparatory to liquefaction air compressed substantially to or above its critical pressure, by subjecting the same in successive cooling steps, in the order named, to—1st, a counter-current of colder expanded and expanding gases of substantially atmospheric pressure, in part previously released as a gas from a constant relatively high to a constant relatively low pressure, and in part evaporated from liquid air of substantially atmospheric pressure; 2nd, to a counter-current of evaporating and evaporated liquefied gas released as a liquid from a constant relatively high to a constant relatively low pressure; and 3rd, to a combined counter-current of said expanded gases as released from pressure, and of the vapor and cold expanding gases evaporated from said liquid air of substantially atmospheric pressure.

3. In the art or process of liquefying atmospheric air, the method of cooling a moving column of compressed air which consists, successively of—1st cooling it by a counter-current of low pressure expanded air previously released as a gas from said compressed air column, but not as cold as when released; 2nd, in cooling it by a colder counter-current of evaporating liquefied gas released from pressure; and 3rd, in cooling it by a low-pressure counter-current of still colder expanded air, released from said cooled compressed air column—all of said counter-currents being conducted in juxtaposition with said moving column of compressed air, but in an opposite direction thereto.

4. The art or process of liquefying atmospheric air, which comprises compressing the air and cooling the same; liquefying a portion thereof while under said compression, and sub-cooling the same in a vessel or conduit submerged in or in contact with liquid air of substantially atmospheric pressure—thereby causing partial fractional evaporation thereof by heat derived from said high-pressure liquid being cooled; releasing the unliquefied gaseous residue and liquefying portions thereof at substantially atmospheric pressure; and finally replenishing said low-pressure liquid air, undergoing fractional distillation, by both the air liquefied at high-pressure and that portion of the gaseous residue liquefied as released from pressure.

5. The art or process of liquefying atmospheric air, which comprises compressing the air; liquefying a portion thereof while under said compression, and releasing the gaseous residue from pressure, expanding the same, and liquefying as released a portion of the same at substantially atmospheric pressure; and finally subjecting both liquids to fractional evaporation, and utilizing the vapors therefrom to cool compressed air about to be liquefied.

6. The art or process of liquefying atmospheric air, which comprises compressing the air; liquefying a portion thereof while under said compression, and releasing the gaseous residue from pressure, expanding the same and liquefying as released a portion of the same at substantially atmospheric pressure; and finally subjecting both liquids to fractional evaporation and utilizing the vapors therefrom, and the said unliquefied gaseous residue to cool compressed air about to be liquefied.

7. The process of liquefying air and separating the same into its constituents, oxygen and nitrogen, which comprises compressing the air and cooling the same; partially liquefying the same while compressed, and separating the liquid thus obtained from the gaseous residue by delivering the same to a high-pressure condenser or receiver submerged in liquid air of substantially atmospheric pressure in a low-pressure evaporating vessel; expanding said gaseous residue through a throttled valve and thereby liquefying a portion of said gaseous residue under the "Joule-Thomson effect," and delivering the same to said low-pressure vessel; and finally replenishing the liquid evaporating in said low-pressure vessel by releasing from pressure and delivering to said vessel the liquid in said high pressure submerged condenser.

8. The process of liquefying air and separating the same into its constituents, oxygen and nitrogen, which comprises compressing the air and cooling the same; liquefying portions thereof while compressed, and separating the liquid thus obtained from the gaseous residue by delivering the same to a high pressure condenser or receiver submerged in liquid air of substantially atmospheric pressure in a low-pressure evaporating vessel; expanding said gaseous residue through a throttled valve and thereby liquefying a portion of said gaseous residue under the "Joule-Thomson effect," and delivering same to said low-pressure vessel; and finally replenishing the liquid evaporating in said low pressure vessel by releasing from pressure and delivering to said vessel the liquid in said high-pressure submerged condenser— both the cold vapors from said evaporating vessel, and the cold unliquefied gases from said throttled valve, being utilized to cool the incoming supply of compressed air.

Signed at New York, in the county of New York and State of New York, this 30th day of October, A. D. 1907.

JAMES F. PLACE.

Witnesses:
JOHN H. ACKROYD,
J. G. GADSDEN.